J. Y. PISCEK.
CONDENSING APPARATUS.
APPLICATION FILED APR. 20, 1920.
1,394,502.
Patented Oct. 18, 1921.
2 SHEETS—SHEET 1.
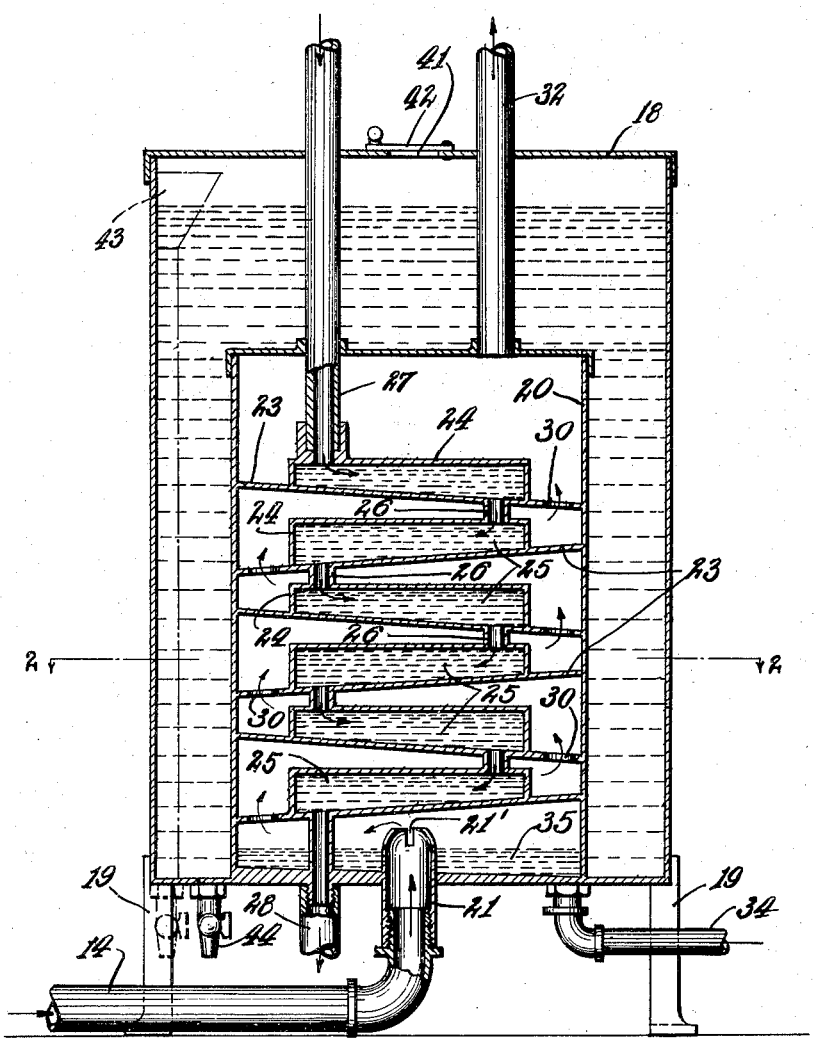
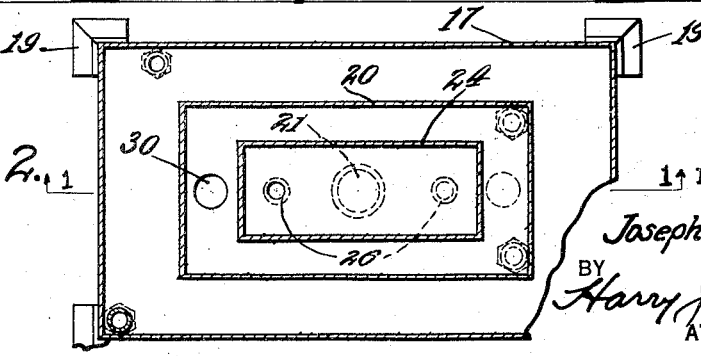
INVENTOR
Joseph Y. Piscek,
BY
Harry Jacobson
ATTORNEY

J. Y. PISCEK.
CONDENSING APPARATUS.
APPLICATION FILED APR. 20, 1920.

1,394,502.

Patented Oct. 18, 1921.
2 SHEETS—SHEET 2.

INVENTOR
Joseph Y. Piscek,
BY
Harry Jacobson
ATTORNEY

UNITED STATES PATENT OFFICE.

JOSEPH Y. PISCEK, OF GALLUP, NEW MEXICO, ASSIGNOR OF ONE-HALF TO JOHN GULLAS, OF GALLUP, NEW MEXICO.

CONDENSING APPARATUS.

1,394,502.  Specification of Letters Patent.  Patented Oct. 18, 1921.

Application filed April 20, 1920. Serial No. 375,185.

*To all whom it may concern:*

Be it known that I, JOSEPH Y. PISCEK, citizen of Czecho-Slovakia, residing at Gallup, in the county of McKinley and State of New Mexico, have invented certain new and useful Improvements in Condensing Apparatus, of which the following is a specification.

This invention relates to an apparatus for securing alcohol from baking bread wherein the alcohol is driven off by the heat during the baking of the bread and is collected and condensed.

The invention has for an object to provide a simple and efficient type of apparatus for this purpose which may be readily applied in connection with a baker's oven of the usual kind.

More specifically the invention has for an object to provide a novel and improved condensing device.

For further comprehension of the invention, and of the objects and advantages thereof, reference will be had to the following description and accompanying drawings, and to the appended claims in which the various novel features of the invention are more particularly set forth.

Figure 1 of the drawings is a vertical sectional view of the condenser forming the main part of the apparatus, this view being taken on the line 1—1 of Fig. 2.

Fig. 2 is a horizontal section on the line 2—2 of Fig. 1.

Figure 3:
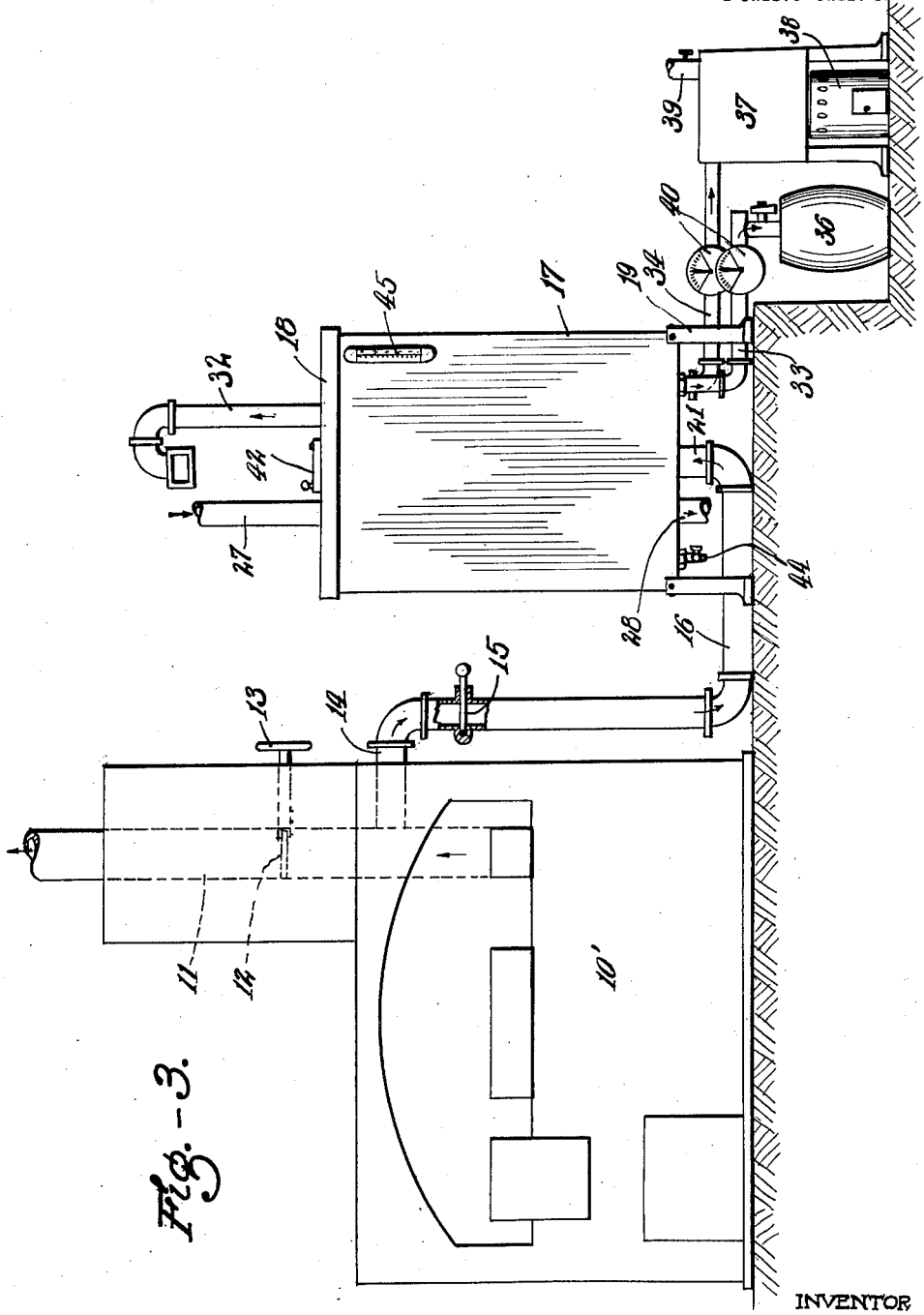
Fig. 3 is a front view of the apparatus showing it in connection with a baker's oven.

In the drawings the numeral 10' indicates generally a baker's oven of ordinary construction and provided with the usual outlet flue 11 for the vapors driven off during baking, this flue being controlled by a damper 12 having a handle 13.

Leading from this flue near the lower end thereof is a pipe 14 controlled by a damper 15, this pipe leading to the bottom of the condenser, indicated generally at 16 in Fig. 3.

This condenser comprises an outer casing or receptacle 17 having a cover 18 and being supported on legs 19 an interior casing 20 being located in the outer casing and resting on the bottom thereof, being spaced inwardly from the outer casing at its sides and top. A nipple 21, having a slotted upper end 21', is entered into the bottom of this inner casing and has the pipe 14 connected to the lower end thereof, the upper end of the nipple projecting above the bottom of the casing so as to prevent the condensed alcohol flowing backward through the pipe 14.

Formed within the interior casing 20 is a zigzag water channel and a zig-zag channel for the alcohol vapors which extend from the top to the bottom thereof, these channels being formed as follows: A series of vertically spaced partitions 23 extend across the casing and are slightly inclined to the horizontal, the alternate partitions inclining in opposite directions. Upon each of these partitions is fixed a shallow box-like member 24 thereby forming a series of water compartments 25. The adjacent ones of these compartments are connected at their ends by short pipes 26, the pipes between alternate compartments being at opposite ends as shown. Leading into the top compartment is a pipe 27 which may be connected to any suitable source of supply of cold water, an outlet pipe 28 leading from the bottom compartment, the inclined arrangement of the partitions 23 accelerating the flow or circulation of the water.

The zig-zag path or channel for the alcohol vapors is formed by placing openings 30 in the partitions 23, the openings in alternate partitions being at opposite ends thereof, the compartments 25 being each spaced at sides and top from the sides of the casing 20 and the partition next above to permit of flow of the alcohol vapor from one opening to the next.

From the top of the casing 20 a pipe 32 leads to the open air and is adapted to carry away any uncondensed vapors. From the bottom of the casing 20 a pair of pipes 33 and 34 lead and are adapted to conduct the condensed alcohol, indicated at 35, either to a barrel or like receptacle 36, or to a still 37 heated by an oil stove 38 where it may be re-distilled in order to purify it, the re-distilled alcohol being carried through a pipe 39 to a condenser similar to that already described. These pipes 33 and 34 may have meters 40 placed therein to measure the quantity of alcohol flowing therethrough.

The outer receptacle 17 is adapted to be filled with water as indicated, and opening 41, closed by a door 42, being provided both for filling purposes and for testing of the temperature by the insertion of a thermometer. An overflow outlet 43 may be provided in the receptacle for the escape of excess water while a drip cock 44 may be provided to allow the receptacle to be emptied when water height indicator 45 shows a higher water level than desired.

It is believed that the manner of operation of my improved apparatus will be apparent from the above description, the alcohol vapors passing through the pipe 14 and flowing upwardly through the casing 20 in the zig-zag channel provided. The arrangement of the water compartments 25 in the casing, and the provision of the water in the outer receptacle provides a substantially complete water jacketing of the walls of the said vapor channel causing the vapors to condense and the condensed alcohol to drip down into the bottom of the casing from which it is conducted by the pipes 33 and 34.

Having thus described my invention what I claim as new and desire to protect by Letters Patent of the United States is as follows:—

1. A condenser for the purpose specified comprising an outer casing, an inner casing spaced at sides and top from the sides and top of said outer casing, and means providing zig-zag vapor and water passages leading between top and bottom of said inner casing.

2. A condenser for the purpose specified comprising an outer casing, an inner casing spaced at sides and top from the sides and top of said outer casing, a series of compartments formed in said inner casing and spaced vertically from one another and inwardly from the sides of the casing, said compartments being connected together at alternating opposite ends to provide a zig-zag water channel, and means providing a zig-zag vapor channel around said compartments.

3. A condenser for the purpose specified comprising an outer casing, an inner casing spaced at sides and top from the sides and top of said outer casing, a series of vertically spaced partitions extending across said inner casing, box-like elements supported on said partitions and forming vertically spaced compartments spaced at the sides thereof from the sides of said inner casing, said elements being connected together at alternating opposite ends to provide a zig-zag water channel, said partitions having openings therein at alternating opposite ends to provide a zig-zag vapor channel.

4. A condenser for the purpose specified comprising an outer casing, an inner casing resting on the bottom thereof and spaced at its sides and top from the sides and top of said outer casing, a series of vertically spaced inclined partitions extending across said inner partition, box-like elements supported on said partitions and forming vertically spaced compartments spaced at the sides thereof from the sides of said inner casing, said box-like elements being connected together at alternating opposite ends to provide a zig-zag water channel, and being spaced at sides and tops from the sides of the inner casing and the partitions immediately thereabove, said partitions having openings therein at alternating opposite ends to provide a zig-zag vapor channel leading over and around said box-like elements.

In testimony whereof I have affixed my signature, this 5th day of April, 1920.

JOSEPH Y. PISCEK.